United States Patent
Dubois et al.

(10) Patent No.: US 10,811,933 B2
(45) Date of Patent: Oct. 20, 2020

(54) ELECTRIC MOTOR COMPRISING A STRONG ACOUSTIC ATTENUATION DEVICE

(71) Applicant: ALSTOM Transport Technologies, Saint-Ouen (FR)

(72) Inventors: Philippe Dubois, Trepot (FR); Xavier Kania, Scey-Maisieres (FR); Jean-Pierre Lombard, Miserey-Salines (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 272 days.

(21) Appl. No.: 15/673,778

(22) Filed: Aug. 10, 2017

(65) Prior Publication Data
US 2018/0048210 A1    Feb. 15, 2018

(30) Foreign Application Priority Data
Aug. 11, 2016   (FR) .................................... 16 57729

(51) Int. Cl.
*H02K 5/24*   (2006.01)
*H02K 9/06*   (2006.01)

(52) U.S. Cl.
CPC ............... *H02K 5/24* (2013.01); *H02K 9/06* (2013.01)

(58) Field of Classification Search
CPC .. H02K 1/18; H02K 1/20; H02K 5/04; H02K 5/24; H02K 5/20; H02K 9/02; H02K 9/04; H02K 9/06; H02K 2209/00
USPC .... 310/51, 58, 59, 62–63, 65, 423, 429, 431
See application file for complete search history.

(56) References Cited

U.S. PATENT DOCUMENTS

| | | | |
|---|---|---|---|
| 2008/0048510 A1* | 2/2008 | Onodera | F01P 5/06 310/52 |
| 2010/0223751 A1 | 9/2010 | Liddell | |
| 2019/0027996 A1* | 1/2019 | Lang | H02K 9/06 |

FOREIGN PATENT DOCUMENTS

| | | |
|---|---|---|
| CN | 201563022 U | 8/2010 |
| EP | 0105389 A2 | 4/1984 |
| EP | 0261295 A1 | 3/1988 |
| WO | 0111206 A2 | 2/2001 |

OTHER PUBLICATIONS

Patent Translate Description EP0261295 pp. 1-5 (Year: 2019).*
French Search for Report for FR1657729 dated Feb. 13, 2017.

* cited by examiner

*Primary Examiner* — Nguyen Tran
(74) *Attorney, Agent, or Firm* — Pearne & Gordon LLP

(57) ABSTRACT

This motor includes a frame defining an inner space (VI) in which a rotor, a stator and a fan are housed, the frame comprising an a first opening placing the inner space (VI) of the frame in fluid communication with the outside of the frame, a second opening placing the inner space (VI) of the frame in fluid communication with the outside of the frame along a radial axis (R) substantially perpendicular to a rotation axis (X) of the rotor. The fan being arranged near the second opening and being configured to create a flow (F) of a gaseous fluid, a first acoustic attenuation device is housed in the second opening so as to partially close the second opening.

20 Claims, 2 Drawing Sheets

ELECTRIC MOTOR COMPRISING A STRONG ACOUSTIC ATTENUATION DEVICE

This application claims priority from French Patent Application No. 16 57729 filed on Aug. 11, 2016. The content of this application is incorporated herein by reference in its entirety.

BACKGROUND

The present invention relates to an electric traction motor for a railway vehicle, comprising an acoustic attenuation device.

The optimization of electric motors leads to increasingly compact electric motors needing effective cooling.

The cooling is in particular done by a fan inside or outside the electric motor arranged to inject cooling air into the motor in order to cool the stator and/or the rotor of the motor. To increase the cooling efficiency, it is possible to increase the size and/or flow rate of the fan.

However, increasing the size and/or flow rate of the fan increases the noise level emitted by the electric motor, whereas this level must be below a predefined threshold noise level, in order to satisfy the regulations imposed by the laws in the country where the electric motor is used.

For this reason, it is known to use an acoustic attenuation device making it possible to effectively decrease the noise level emitted by the electric motor.

Such electric motors comprising an acoustic attenuation device are for example described in documents U.S. Pat. Nos. 5,124,600 and 4,150,313.

However, the architecture of such electric motors is not fully satisfactory. Indeed, these motors are cumbersome, and their acoustic attenuation device makes regular maintenance of the electric motors complicated.

One of the aims of the invention is to propose an electric motor comprising an acoustic attenuation device that is compact and allows easy regular maintenance.

To that end, the invention relates to an electric motor, comprising:
  a frame defining an inner space in which a rotor, a stator and a fan are housed, the frame comprising:
    a first opening placing the inner space of the frame in fluid communication with the outside of the frame,
    a second opening placing the inner space of the frame in fluid communication with the outside of the frame along a radial axis substantially perpendicular to a rotation axis of the rotor,
  the fan being arranged near the second opening and being configured to create a flow of a gaseous fluid,
  wherein a first acoustic attenuation device is housed in the second opening so as to partially close the second opening,
  the second opening comprises at least a first passage and a second passage for the passage of the gaseous fluid, the first passage being closed by the first acoustic attenuation device,
  a cover is placed opposite the second opening, the cover having at least one soundproofing area placed opposite the second passage and at least one air passage area placed opposite the first passage.

Such an electric motor has multiple advantages, which are summarized non-exhaustively below.

The first acoustic attenuation device housed in the second opening of the frame of the electric motor makes it possible to substantially keep the initial bulk of the electric motor. Thus, the size of the electric motor is not increased by the presence of the attenuation device.

Partially closing the second opening makes it possible to adjust the noise leaving the electric motor to a predefined level.

Advantageously, an electric motor according to the invention may comprise one or more of the following features, considered alone or in any technically possible combinations.
  the fan is a centrifugal fan;
  the soundproofing area of the cover comprises a second acoustic attenuation device;
  the first and second acoustic attenuation devices have at least one multilayer structure comprising a bottom layer, at least one cavity layer applied on the bottom layer and a first sound passage layer applied on the cavity layer;
  the cavity layer is formed by at least one cylinder with a hexagonal base extending over a predefined distance between the bottom layer and the first sound passage layer;
  the multilayer structure comprises several superimposed cavity layers;
  the first sound passage layer is formed by a metal sheet including micro-holes;
  the bottom layer is substantially soundproof and formed by a closed metal sheet;
  the first acoustic attenuation device comprises a multilayer structure, the bottom layer of which is a second sound passage layer; and
  the cover is made from at least two parts configured to partially cover the second opening.

The invention will be better understood upon reading the following description, provided solely as an example and done in reference to the drawings, in which.

Figure 1:
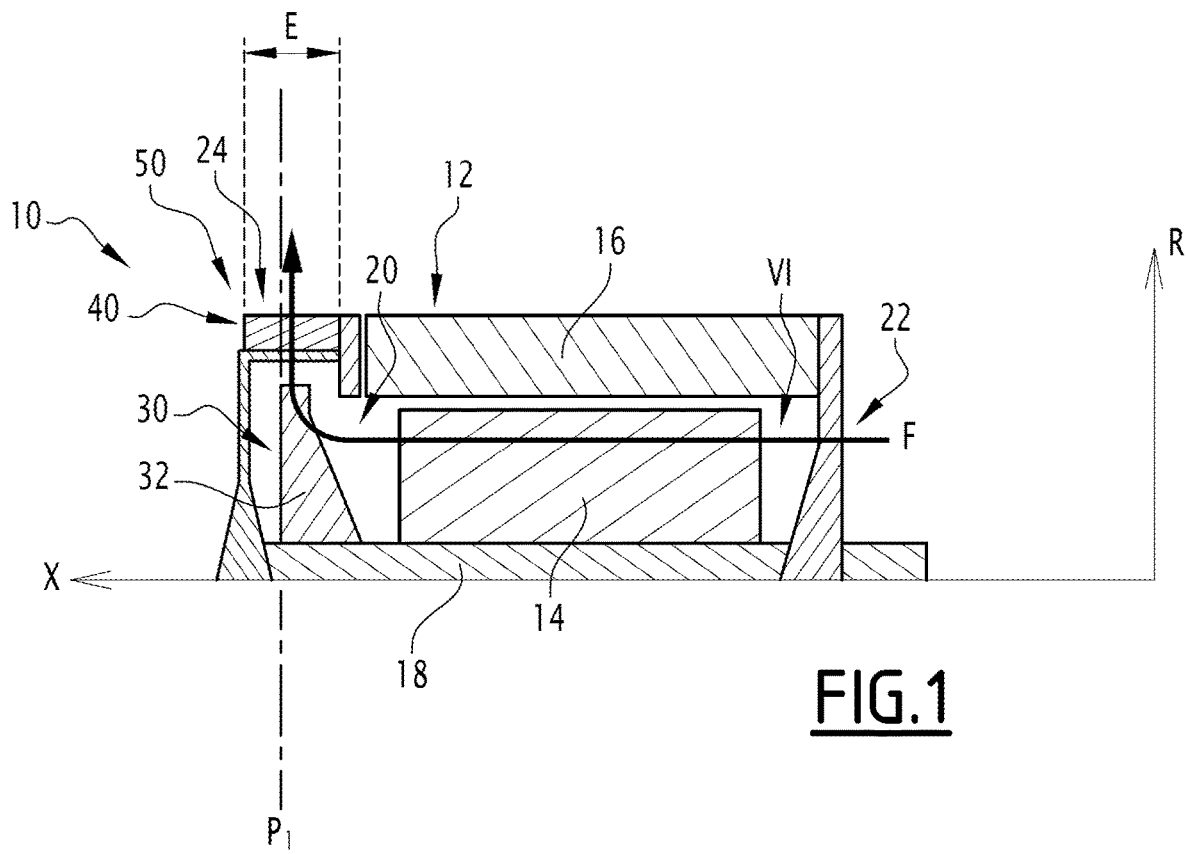
FIG. 1 is a partial sectional view along the rotation axis X of the rotor of an electric motor according to the invention.
Figure 2:
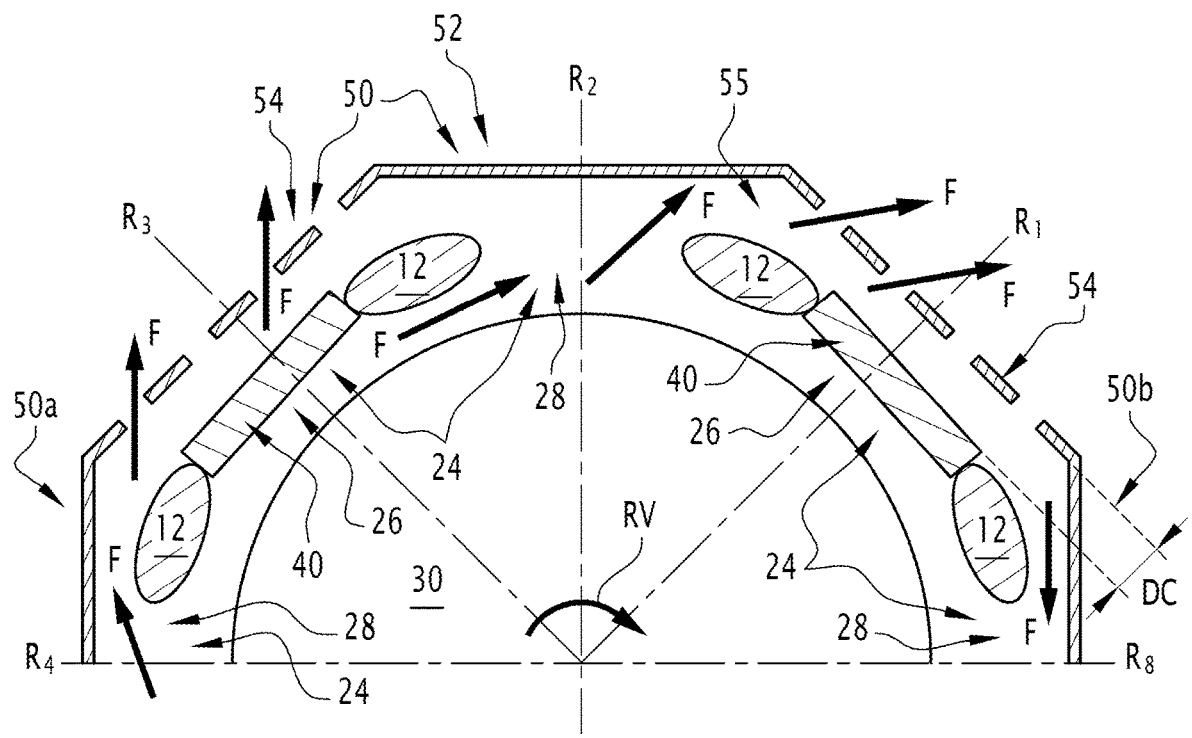
FIG. 2 is a partial sectional view along a plane P perpendicular to the rotation axis X of the rotor of the electric motor of FIG. 1.

FIGS. 1 and 2 show an electric motor 10 according to a first embodiment of the invention. The electric motor 10 comprises a frame 12 defining an inner space VI in which a rotor 14 and a stator 16 are housed. The rotor 14 is mounted secured in rotation on a rotation shaft 18 inside the frame 12 and mounted rotating around a rotation axis X relative to stator 16 and the frame 12. The stator 16 surrounds the rotor 14 and is coaxial thereto inside the frame 12. Traditionally, the rotor 14 and the stator 16 make it possible to convert electricity into mechanical energy delivered by the shaft 18 of the rotor 14. The operation of such a motor is known, and will not be described in more detail here.

According to one embodiment, the frame 12 comprises a first opening 22 placing the inner space VI of the frame 12 in fluid communication with the outside of the frame 12. The first opening 22 is for example oriented along an axis substantially parallel to the rotation axis X.

The frame 12 comprises a second opening 24 placing the inner space VI of the frame 12 in fluid communication with the outside of the frame 12 along a radial axis R substantially perpendicular to the rotation axis X.

The frame 12 comprises a cooling circuit 20 making it possible to guide a flow F of outside gaseous fluid, for example ambient air, from the first opening 22 to the second opening 24.

More specifically, the cooling circuit 20, shown schematically in FIG. 1, is arranged so that the outside gaseous fluid coming from outside the frame 12 rushes into the first opening 22. The outside gaseous fluid is guided by the cooling circuit 20 through the inner space VI of the frame 12 is for example to cool the stator 16 by causing the cooling circuit 20 to pass through and/or around the stator 16. The second opening 24 lastly makes it possible to discharge the heated outside gaseous fluid toward the outside of the frame 12. Thus, the frame 12 and the stator 16 are efficiently cooled by the ambient air coming from the environment of the motor 10.

The second opening 24 comprises a first acoustic attenuation device 40 to attenuate a noise. The first acoustic attenuation device 40 will be described in more detail below.

The second opening 24 is covered by a cover 50. The cover 50 will be described in more detail below.

The second opening 24 comprises at least a first passage 26 and a second passage 28.

The first passage 26 extends along a first radial axis R1. Radial refers to an axis extending in a plane substantially perpendicular to the rotation axis X. The first passage 26 allows the passage of the flow path of gaseous fluid between the inner space VI of the frame 12 and the outside of the frame 12. According to one embodiment, the first passage 26 is closed by the first acoustic attenuation device 40.

The second passage 28 extends along a second radial axis R2, different from the first radial axis R1. The second passage 28 also allows the passage of the flow path of gaseous fluid between the inner space VI of the frame 12 and the outside of the frame 12.

In the case where the second opening 24 comprises more than two first passages 26 and/or more than two second passages 28, each passage extends along a different radial axis.

Such an example comprising a total of eight first passages 26 and second passages 28 with respective radial axes R1 to R8 is shown in FIG. 2 in sectional view along a plane P1 perpendicular to the rotation axis X of the rotor.

In the present description, the terms "upstream" and "downstream" are defined relative to the circulation direction of a flow path of gaseous fluid in the electric motor 10.

The shaft 18 of the rotor 14 is equipped with a fan 30 comprising at least one blade 32 able to create the flow F of gaseous fluid in the cooling circuit 20 inside the frame 12. In other words, the fan 30 is arranged to promote the circulation of the gaseous fluid in the cooling circuit 20.

The fan 30 is arranged near the second opening 24.

The fan 30 is rotatable in a rotation direction RV. The rotation direction RV influences the direction of the flow F of gaseous fluid circulating in the periphery of the motor 10 between the frame 12 and the cover 50. If the rotation direction RV is reversed, the direction of the flow F of gaseous fluid is also reversed. In other words, when the rotation direction RV of the fan 30 is clockwise, as shown in FIG. 2, the flow F circulates substantially in the clockwise direction in the periphery of the motor 10 between the frame 12 and the cover 50, and vice versa.

The direction of the flow F of gaseous fluid in the inner volume VI is independent of the rotation of the fan 30. In other words, the outside gaseous fluid coming from outside the frame 12 rushes into the first opening 22 and is discharged through the second opening 24.

The example illustrated in FIG. 2 shows a fan 30 whereof the rotation RV is clockwise and a flow F of gaseous fluid with an orientation substantially perpendicular to the rotation axis X of the fan 30.

The blade(s) 32 of the fan 30 are for example situated upstream from the second opening 24. Thus, a gaseous flow is created inside the frame 12 owing to the aspiration of the gaseous fluid from outside the motor through the first opening 22 and the expulsion of this gaseous fluid through the second opening 24.

The fan 30 is for example a centrifugal fan housed in the inner space of the frame 12 of the motor 10. The use of a centrifugal fan inside the frame 12 makes it possible to minimize the size of the electric motor 10 relative to the use of an external fan.

The electric motor 10 further comprises at least one first acoustic attenuation device 40 positioned near the fan 30.

The first acoustic attenuation device 40 is housed in the second opening 24. Thus, the first acoustic attenuation device 40 partially closes the second opening 24. The first acoustic attenuation device 40 is fastened to the frame 12 by fastening means, for example screws (not shown). Thus, the first acoustic attenuation device 40 can be disassembled and mounted easily during maintenance of the electric motor 10.

The first acoustic attenuation device 40 can be housed in the first passage 26 to completely close this first passage 26. In this case, the second passage 28 is not closed by the first acoustic attenuation device 40, as shown by the example of FIG. 2.

Figure 4:
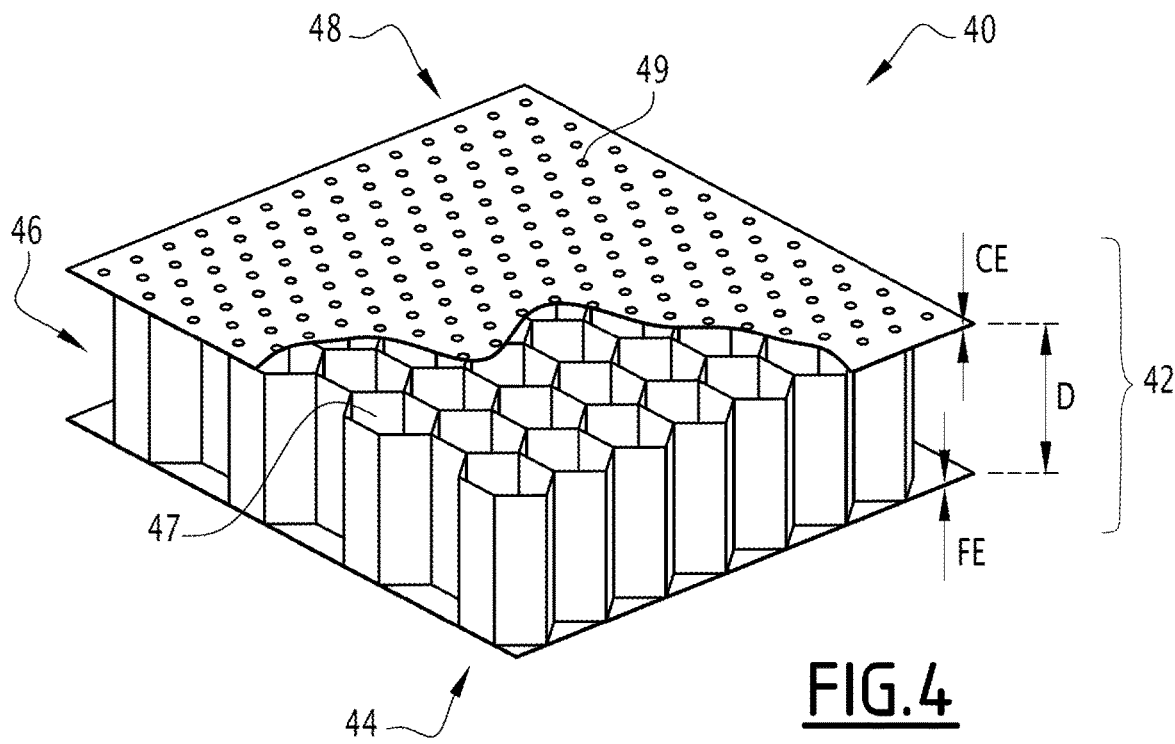
FIG. 4 is a schematic perspective illustration of an acoustic attenuation device of FIGS. 1 to 3.

The first acoustic attenuation device 40 is shown in detail in FIG. 4 and comprises at least one multilayer structure 42 comprising a substantially soundproof bottom layer 44. The bottom layer 44 is for example formed by a metal sheet, for example stainless steel. The bottom layer 44 for example has a thickness FE substantially comprised between 0.5 mm and 5 mm.

The multilayer structure 42 comprises at least one cavity layer 46 that is applied on the bottom layer 44. The cavity layer 46 is for example formed by at least one cylinder 47.

The base of the cylinder 47 is in contact with the bottom layer 44. The cylinder 47 for example has a hexagonal base. The cylinder 47 can be made from metal.

The cylinder 47 extends along an axis extending perpendicular to a plane defined by the bottom layer 44.

The cylinder 47 extends over a predefined distance D, measured along the axis of the cylinder, between the bottom layer 44 and a first sound passage layer 48.

The predefined distance D is for example comprised between 5 mm and 100 mm.

According to one embodiment shown in FIG. 4, the cavity layer 46 is formed by several adjacent cylinders 47 to form a honeycomb cavity layer.

The first sound passage layer 48 is applied on the cavity layer 46 and comprises micro-holes 49. The micro-holes 49 for example have a diameter comprised between 0.5 mm and 5 mm.

The first sound passage layer 48 is parallel to the bottom layer 44.

The first sound passage layer 48 is for example formed by a stainless steel sheet.

The first sound passage layer 48 has a thickness CE substantially comprised between 0.5 mm and 5 mm.

The first sound passage layer 48 allows the passage of the flow F of a gaseous fluid through micro-holes 49 inside at least one cylinder of the cavity layer.

Advantageously, the acoustic attenuation device 40 is oriented such that the flow F of gaseous fluid encounters the first sound passage layer 48.

According to one embodiment, the first sound passage layer 48 is oriented toward the fan 30, while the bottom layer 44 is oriented toward the outside of the motor.

When the flow F of gaseous fluid is flush with or penetrates the first sound passage layer 48, the sound waves emitted by the gaseous fluid F pass through the micro-holes 49 of the first sound passage layer 48 to penetrate the cavity layer 46.

Inside the cavity layer 46, the sound waves are guided by walls of the cylinder 47 and are reflected by the bottom layer 44, and the interaction between guided and reflected waves generates an attenuation according to the Helmholtz principle.

This multilayer structure 42 corresponds to a Helmholtz-type sandwich.

Thus, the noise produced by the rotor 14, the fan 30 and the magnetic field created during the interaction of the rotor 14 and the stator 16 can be attenuated efficiently by the acoustic attenuation device 40.

The attenuation of the noise by the acoustic attenuation device 40 is about 2 to 5 dB.

The possible attenuation of the acoustic frequencies of the noise is primarily comprised between 0 and 2 kHz.

The cavity layer makes it possible to attenuate a predefined acoustic frequency. The predefined acoustic frequency can be chosen beforehand based on the predefined distance D between the bottom layer and the first sound passage layer 48.

Alternatively, the acoustic frequency to be attenuated can be chosen based on the diameter of the micro-holes 49, and/or based on the thickness CE of the first sound passage layer 48.

Thus, the noise created inside the electric motor 10 passing through the second opening 24 is efficiently attenuated.

The first acoustic attenuation device 40 is oriented such that the first sound passage layer 48 is turned toward the fan 30. The electric motor 10 comprises a cover 50 to protect at least the second opening 24.

The cover 50 is fastened using screws (not shown) to the frame 12. Thus, the cover 50 can be disassembled and mounted easily during maintenance of the electric motor 10.

The cover 50 comprises at least one soundproof area 52 and at least one air passage area 54.

The cover 50 and the frame 12 form a peripheral channel 55 for passage of the flow F of gaseous fluid. The peripheral channel 55 includes a height DC that extends along a radial axis R between the frame 12 and the cover 50 and that is comprised between 20 mm and 100 mm.

Owing to the peripheral channel 55, the flow F of gaseous fluid can circulate in the periphery of the motor 10 between the frame 12 and the cover 50. The direction of the flow F of gaseous fluid in the peripheral channel 55 depends on the rotation direction of the fan 30. In other words, a rotation direction of the fan 30, for example clockwise, causes a substantially clockwise direction of the flow F of gaseous fluid and vice versa in the peripheral channel 55.

The soundproof area 52 of the cover 50 is placed opposite the second passage 28 when the cover 50 is fastened to the frame 12.

The soundproof area 52 extends in a plane parallel to the rotation axis X. The soundproof area 52 is for example formed by a metal sheet, for example made from stainless steel or another metal protected against corrosion.

The soundproof area 52 makes it possible to guide a flow F of gaseous fluid in a direction parallel to a surface defined by the soundproof area 52.

In other words, the soundproof area 52 at least partially blocks the noise coming from the inner space VI of the frame 12, so that it is reflected onto the surface defined by the soundproof area 52.

The air passage area 54 is placed opposite from the first passage 26 when the cover 50 is fastened to the frame 12. The air passage area 54 extends in a plane parallel to the rotation axis X. The air passage area 54 is for example formed by a metal sheet including holes.

The holes of the air passage area 54 allow the flow F of gaseous fluid to traverse the air passage area 54 of the cover 50. In other words, the flow F of gaseous fluid coming from the inner space VI of the frame 12 can pass through the air passage area 54 of the cover 50 toward the outside of the electric motor 10.

On its path from the inner space VI of the frame 12 toward the outside, the flow F of gaseous fluid encounters the first acoustic attenuation device 40 and/or passes through the second passage 28. Next, the flow F encounters the soundproof area 52 to be guided toward the air passage area 54 toward the outside. At the air passage area 54 of the cover 50, the flow F of gaseous fluid at least partly traverses the air passage 54 toward the outside of the electric motor 10.

It is possible that, at the air passage area 54 of the cover 50, the flow F of gaseous fluid may at least partly traverse the sound passage 54 to continue in the peripheral channel 55.

Figure 3:
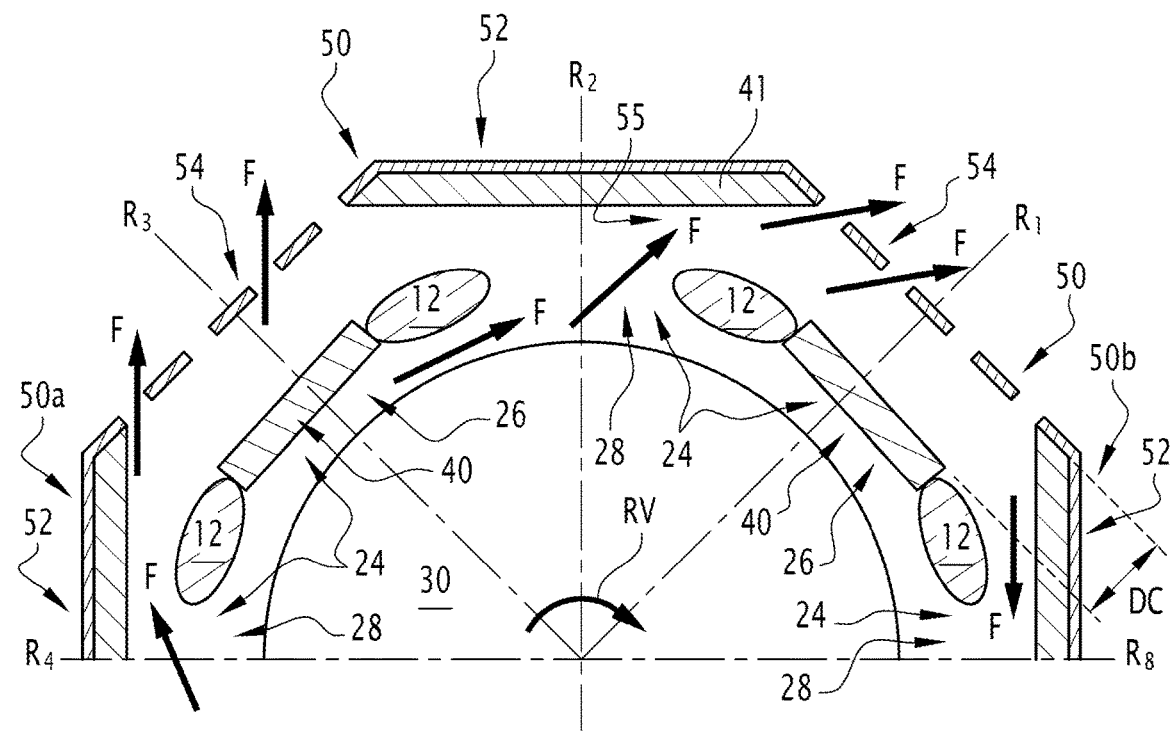
FIG. 3 is a partial sectional view along a plane P1 perpendicular to the rotation axis X of the rotor of an alternative embodiment of an electric motor according to the invention.

Thus, the path of the flow F of gaseous fluid comprises at least one baffle modifying the direction of the flow, as shown in FIGS. 2 and 3.

Owing to this baffle formed by the first acoustic attenuation device 40 and the soundproof area 52, the noise leaving through the second opening 24 is efficiently attenuated.

The cover 50 is made from at least two parts 50*a* and 50*b* configured to partially cover the second opening 24. The first part 50*a* and the second part 50*b* can be disassembled from the frame 12 independently of one another. This allows partial disassembly of the cover 50 to access the inside of the frame 12 through the second opening 24 during maintenance of the electric motor 10. Thus, maintenance of the electric motor 10 becomes easier compared to maintenance requiring complete disassembly of the cover 50 to access the inside of the frame 12.

The cover 50 extends in a direction parallel to the rotation axis X over a distance with a thickness E comprised between 20 and 200 mm.

Advantageously, the cover 50 does not exceed the radial dimensions of the frame 12 of the electric motor 10. Thus, the electric motor 10 keeps a compact size.

According to one alternative embodiment, which may be combined with the aforementioned embodiment, the first acoustic attenuation device 40 comprises a multilayer structure 42 whereof the bottom layer 44 is a second sound passage layer. The second sound passage layer is identical to the first sound passage layer 48.

This first acoustic attenuation device 40 therefore includes a cavity layer 46 inserted between two sound passage layers.

Thus, because the air passage area 54 is placed opposite the first acoustic attenuation base 40, the flow F of gaseous fluid may, at least in part, be flush with or face the second sound passage layer before passing through the air passage area 54 of the cover 50.

When the flow F of gaseous fluid is flush with or penetrates the second passage layer, the sound waves produced by the flow F of gaseous fluid enters the cavity layer 46 of the first acoustic attenuation device 40 through the holes of the second sound passage layer.

Next, these waves are attenuated by the cavity layer 46 according to the Helmholtz principle.

Consequently, the noise is attenuated again by the acoustic attenuation device 40. The attenuation of the noise is then increased.

In one alternative that can be combined with the aforementioned embodiment and shown in FIG. 3, the soundproof area 52 comprises a second acoustic attenuation device 41. The second acoustic attenuation device 41 can comprise the same structure as the first acoustic attenuation device 40.

The second acoustic attenuation device 41 for example comprises a soundproof bottom layer 44 and a sound passage layer 48. In this case, the first sound passage layer 48 of the second acoustic attenuation device 41 is oriented toward the fan 30.

Owing to the second acoustic attenuation device 41, the attenuation of the noise leaving the second opening 24 is improved.

In one embodiment including several first passages 26 and at least one second passage 28, it is possible to provide several adjacent first passages 26 in a radial sector defined between a first radial axis and a second radial axis different from the first radial axis. Thus, the noise emitted by the electric motor 10 in this radial sector is decreased.

In one alternative, the acoustic attenuation device 40 is housed in the second passage 28 and the first passage 26 has no acoustic attenuation device 40.

In still another alternative, the acoustic attenuation device 40 is housed partially in the first passage 26 and partially in the second passage 28.

According to an alternative embodiment that can be combined with those previously described, the multilayer structure 42 comprises several superimposed cavity layers 46 including a perforated plate or a membrane between each cavity layer 46. In this case, it is possible to attenuate the noise in a frequency range.

It is possible to orient the first opening 22 in a direction perpendicular to the rotation axis X. In this case, it is possible to apply the teaching described above relative to the acoustic attenuation device to the first opening 22.

What is claimed is:

1. An electric motor, comprising:
a frame defining an inner space in which a rotor, a stator and a fan are housed, the frame comprising:
a first opening placing the inner space of the frame in fluid communication with an outside of the frame, and
a second opening placing the inner space of the frame in fluid communication with the outside of the frame along a radial axis perpendicular to a rotation axis of the rotor, and
the fan being arranged near the second opening and being configured to create a flow of a gaseous fluid, wherein a first acoustic attenuation device is housed in the second opening so as to partially close the second opening,
the second opening comprises at least a first passage and a second passage for the passage of the gaseous fluid, the first passage and the second passage being defined at least partially by the frame, the first acoustic attenuation device being housed in the first passage, and the first passage being closed by the first acoustic attenuation device,
a cover is mounted on the frame and is disposed across from the second opening, the cover having at least one soundproofing area disposed opposite the second passage and at least one air passage area disposed opposite the first passage, and the cover and the frame forming a peripheral channel for the passage of the flow of the gaseous fluid at the outside of the frame and,
the first passage and the second passage being adapted for the passage of the flow of the gaseous fluid between the inner space of the frame and the outside of the frame, the first passage extending along a first radial axis, the second passage extending along a second radial axis different from the first radial axis, and said first and second radial axes extending in a plane perpendicular to and being circumferentially arranged around the rotation axis of the rotor.

2. The electric motor according to claim 1, wherein the fan is a centrifugal fan.

3. The electric motor according to claim 1, wherein the soundproofing area of the cover comprises a second acoustic attenuation device.

4. The electric motor according to claim 3, wherein the first and second acoustic attenuation devices have at least one multilayer structure comprising a bottom layer, at least one cavity layer applied on the bottom layer and a first sound passage layer applied on the cavity layer.

5. The electric motor according to claim 4, wherein the cavity layer is formed by at least one cylinder with a hexagonal base extending over a predefined distance between the bottom layer and the first sound passage layer.

6. The electric motor according to claim 4, wherein the multilayer structure comprises several superimposed cavity layers.

7. The electric motor according to claim 4, wherein the first sound passage layer is formed by a metal sheet including micro-holes.

8. The electric motor according to claim 4, wherein the bottom layer is soundproof and formed by a closed metal sheet.

9. The electric motor according to claim 1, wherein the first acoustic attenuation device comprises a multilayer structure comprising a bottom layer that is a second sound passage layer.

10. The electric motor according to claim 9, wherein the cover is made from at least two parts configured to partially cover the second opening.

11. The electric motor according to claim 1, further comprising a plurality of additional first passages and a plurality of additional second passages, the first passage and the additional first passages providing a first passage group and the second passage and the additional second passages providing a second passage group, and wherein the passages of the first passage group and the passages of the second passage group are alternatively arranged around the rotation axis of the rotor.

12. The electric motor according to claim 1, wherein the first passage and the second passage are circumferentially spaced from one another about the rotation axis of the rotor.

13. The electric motor according to claim 1, wherein the first passage and the second passage are adapted for the passage of the flow of the gaseous fluid between the inner space of the frame and the peripheral channel.

14. The electric motor according to claim 1, wherein the peripheral channel is disposed circumferentially about the rotation axis of the rotor.

15. The electric motor according to claim 1, wherein the first passage extends along a first radial axis, and the second passage extends along a second radial axis different from the first radial axis, and wherein said first and second radial axes extend in a plane perpendicular to the rotation axis of the rotor.

16. The electric motor according to claim 1, wherein the at least one soundproofing area of the cover is disposed radially opposite the second passage, and the at least one air passage area of the cover is disposed radially opposite the first acoustic attenuation device.

17. The electric motor according to claim 1, wherein the peripheral channel is disposed circumferentially between the frame and the cover, and the first passage and the second passage are adapted for the passage of the flow of the gaseous fluid into the peripheral channel.

18. The electric motor according to claim 1, wherein the first passage extends between two portions of the frame and fully closes off the space between those two portions.

19. The electric motor according to claim 1, wherein the at least one soundproofing area of the cover is disposed radially opposite the second passage.

20. An electric motor, comprising:
a frame defining an inner space in which a rotor, a stator and a fan are housed, the frame comprising:
a first opening placing the inner space of the frame in fluid communication with an outside of the frame, and
a second opening placing the inner space of the frame in fluid communication with the outside of the frame along a radial axis perpendicular to a rotation axis of the rotor,
the fan being arranged near the second opening and being configured to create a flow of a gaseous fluid,
the second opening comprising at least one first passage and at least one second passage for the passage of the gaseous fluid, said at least one first passage and at least one second passage being through slots defined in the frame and arranged around the rotation axis of the rotor,
the electric motor further comprising at least one first acoustic attenuation device housed in the at least one first passage to close the first passage,
the electric motor further comprising a cover mounted on the frame and surrounding the frame, said cover having at least one soundproofing area placed facing the at least one second passage and at least one air passage area placed facing the at least one first passage,
the cover and the frame defining a peripheral annular channel for the passage of the flow of the gaseous fluid in between them, said peripheral annular channel being in fluid communication with the inner of the frame by the second passage and in fluid communication with an outside of the cover by the at least one air passage area.

* * * * *